US012697941B2

(12) United States Patent
Behr et al.

(10) Patent No.: US 12,697,941 B2
(45) Date of Patent: Aug. 4, 2026

(54) METHOD FOR CONTROLLING A CLEANING SYSTEM FOR MOTOR VEHICLE COMPONENTS, CLEANING SYSTEM FOR MOTOR VEHICLE COMPONENTS, AND MOTOR VEHICLE WITH A CLEANING SYSTEM FOR MOTOR VEHICLE COMPONENTS

(71) Applicant: KAUTEX TEXTRON Gmbh & Co. KG, Bonn (DE)

(72) Inventors: Christian Behr, Bonn (DE); Rene Erich Muller, Bonn (DE)

(73) Assignee: KAUTEX TEXTRON GmbH & Co. KG, Bonn (DE)

( * ) Notice: Subject to any disclaimer, the term of this patent is extended or adjusted under 35 U.S.C. 154(b) by 10 days.

(21) Appl. No.: 18/998,742

(22) PCT Filed: Jul. 25, 2023

(86) PCT No.: PCT/EP2023/070605
§ 371 (c)(1),
(2) Date: Jan. 27, 2025

(87) PCT Pub. No.: WO2024/023100
PCT Pub. Date: Feb. 1, 2024

(65) Prior Publication Data
US 2026/0027993 A1     Jan. 29, 2026

(30) Foreign Application Priority Data

Jul. 27, 2022    (DE) ..................... 10 2022 118 856.6

(51) Int. Cl.
B60S 1/48          (2006.01)
B60S 1/52          (2006.01)
(Continued)

(52) U.S. Cl.
CPC ................. *B60S 1/481* (2013.01); *B60S 1/52* (2013.01); *B05B 7/1254* (2013.01); *B60R 1/06* (2013.01);
(Continued)

(58) Field of Classification Search
CPC .... B60S 1/481; B60S 1/52; B60S 1/56; B60S 1/54; B60S 1/50; B60S 1/60;
(Continued)

(56) References Cited

U.S. PATENT DOCUMENTS

| | | | |
|---|---|---|---|
| 12,043,225 B1 * | 7/2024 | Jayaratne | ................. B60S 1/54 |
| 2016/0167066 A1 | 6/2016 | Fehr et al. | |

(Continued)

FOREIGN PATENT DOCUMENTS

| | | |
|---|---|---|
| DE | 102021117474 A1 | 1/2022 |
| DE | 102021120155 A1 | 2/2022 |

OTHER PUBLICATIONS

PCT International Search Report (w/ English translation) for corresponding PCT Application No. PCT/EP2023/070605, mailed Nov. 6, 2023, 9 pages.

(Continued)

*Primary Examiner* — Minh Q Le
(74) *Attorney, Agent, or Firm* — Dority & Manning, P.A.

(57) ABSTRACT

A method for controlling a cleaning system for motor vehicle components includes a fluid delivery device, a pressure sensor for determining a pressure generated by the fluid delivery device, a fluid distribution device with at least one input port fluidly connected to the fluid delivery device and with at least two output ports fluidly connected to the input port, wherein each output port is adjustable between an open position and a closed position, at least two cleaning devices, each fluidly connected via a fluid line to a respective output port, and a control device, which is data-coupled (Continued)

Figure 1:
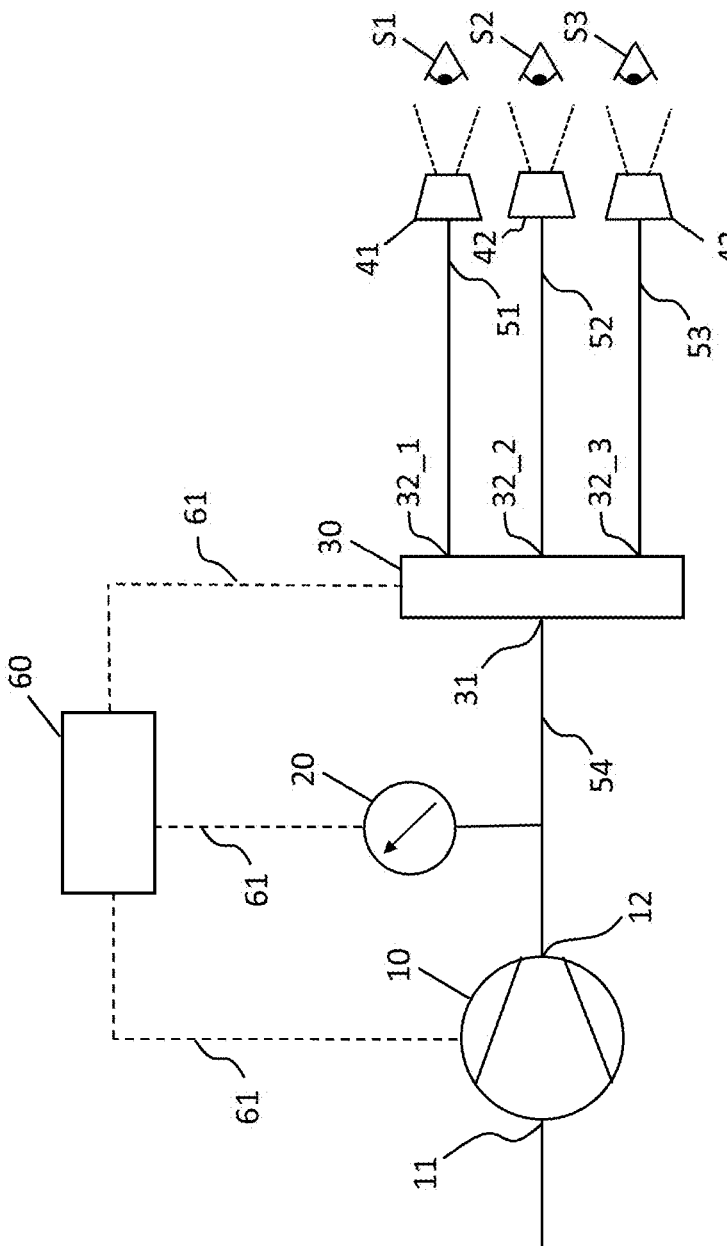

to the fluid delivery device, the pressure sensor and the fluid distribution device for transmitting and/or receiving signals, the method achieving simplified control of the cleaning system and a reduction in the susceptibility of the cleaning system to errors.

11 Claims, 4 Drawing Sheets

(51) Int. Cl.

| | |
|---|---|
| B05B 7/12 | (2006.01) |
| B60R 1/06 | (2006.01) |
| B60S 1/50 | (2006.01) |
| B60S 1/54 | (2006.01) |
| B60S 1/56 | (2006.01) |
| B60S 1/60 | (2006.01) |
| G01M 3/26 | (2006.01) |
| G05D 16/20 | (2006.01) |

(52) U.S. Cl.
CPC .. *B60S 1/50* (2013.01); *B60S 1/54* (2013.01); *B60S 1/56* (2013.01); *B60S 1/60* (2013.01); *G01M 3/26* (2013.01); *G05D 16/2066* (2013.01)

(58) Field of Classification Search
CPC ....... G05D 16/2066; G01M 3/26; B60R 1/06; B05B 7/1254; B05B 7/0408
USPC ..................................................... 137/15.05
See application file for complete search history.

(56) References Cited

U.S. PATENT DOCUMENTS

| | | | | |
|---|---|---|---|---|
| 2019/0143355 | A1 | 5/2019 | Bollermann | |
| 2019/0210570 | A1* | 7/2019 | Schmidt | B60S 1/56 |
| 2019/0275990 | A1 | 9/2019 | Agrotis et al. | |
| 2020/0001832 | A1* | 1/2020 | Deane | B08B 3/02 |
| 2020/0114881 | A1* | 4/2020 | Yamauchi | F04B 11/0033 |
| 2020/0180567 | A1* | 6/2020 | Sakai | B60S 1/485 |
| 2020/0326221 | A1* | 10/2020 | Arreaza | G01F 22/00 |
| 2020/0369245 | A1* | 11/2020 | Baldovino | B60S 1/52 |
| 2021/0380073 | A1* | 12/2021 | Park | B60S 1/481 |
| 2022/0185240 | A1 | 6/2022 | Giraud et al. | |
| 2022/0306049 | A1* | 9/2022 | Badanov | B05B 7/0815 |
| 2023/0059307 | A1* | 2/2023 | Park | B60S 1/481 |
| 2023/0174023 | A1* | 6/2023 | Han | F16K 11/24 |
| | | | | 15/313 |
| 2024/0140368 | A1* | 5/2024 | Lee | B60S 1/52 |
| 2024/0149836 | A1* | 5/2024 | Lee | B60S 1/56 |
| 2024/0198970 | A1* | 6/2024 | Salter | B60S 1/481 |
| 2024/0295641 | A1* | 9/2024 | Fang | G01S 7/4813 |
| 2025/0018901 | A1* | 1/2025 | Op De Beeck | B60S 1/54 |
| 2025/0083645 | A1* | 3/2025 | Zimmer | B60S 1/50 |
| 2025/0326376 | A1* | 10/2025 | Yang | B60S 1/50 |
| 2025/0353471 | A1* | 11/2025 | Thebault | B60S 1/56 |
| 2025/0368162 | A1* | 12/2025 | Xiao | B60S 1/56 |
| 2026/0008437 | A1* | 1/2026 | Behr | B60S 1/481 |

OTHER PUBLICATIONS

Written Opinion of the International Searching Authority for corresponding PCT Application No. PCT/EP2023/070605, mailed Nov. 6, 2023, 7 pages.

* cited by examiner

METHOD FOR CONTROLLING A CLEANING SYSTEM FOR MOTOR VEHICLE COMPONENTS, CLEANING SYSTEM FOR MOTOR VEHICLE COMPONENTS, AND MOTOR VEHICLE WITH A CLEANING SYSTEM FOR MOTOR VEHICLE COMPONENTS

CROSS-REFERENCE TO RELATED APPLICATIONS

This application is the U.S. National Stage entry of International Application No. PCT/EP2023/070605, filed on Jul. 25, 2023, which, in turn, claims priority to DE Patent Application No. 10 2022 118 856.6, filed on Jul. 27, 2022, both of which are hereby incorporated herein by reference in their entireties for all purposes.

The present invention relates to a method for controlling a cleaning system for motor vehicle components. Furthermore, the present invention relates to a cleaning system for motor vehicle components for carrying out the method. Furthermore, the present invention relates to a motor vehicle with a component cleaning system.

Motor vehicles, and in particular motor vehicles designed for autonomous or semi-autonomous driving, usually have a large number of sensors that can be used to monitor the environment and/or a driving situation of the motor vehicle. These vehicle components designed as vehicle sensors can, for example, have optical sensors, cameras, radar sensors or lidar sensors.

To ensure the functionality and operational readiness of motor vehicle components and, in particular, motor vehicle sensors, these must be cleaned regularly. Depending on the motor vehicle component or the type of sensor and the degree of contamination, a cleaning device (cleaning nozzle) of a cleaning system must apply a cleaning fluid at a predetermined fluid pressure to the relevant component and/or the relevant sensor for a predetermined time in accordance with a cleaning request.

Known cleaning systems have been envisaged that have a large number of pressure sensors or flow sensors, each of which is usually assigned to a cleaning nozzle. This plurality of pressure sensors or flow sensors are arranged in the cleaning system and designed to determine the fluid pressures or the flow rate of the cleaning fluid that is discharged from the respective cleaning nozzles. This fluid pressure information is used to control a central fluid delivery device (pump) in such a way that a cleaning requirement is met.

The cleaning systems known from the state of the art therefore have a large number of components and, in particular, a large number of pressure sensors and/or flow sensors. As a result, these cleaning systems are error-prone and cost-intensive. The processes for controlling the corresponding cleaning systems are correspondingly complex.

The present invention is based on the task of providing a method for controlling a cleaning system for motor vehicle components, which enables a simplified control of the cleaning system and also makes it possible for the cleaning system to be less prone to errors and less cost-intensive.

The problem underlying the present invention is solved by a method with the features of claim 1. Embodiments of the method are described in the claims dependent on claim 1.

More specifically, the problem underlying the present invention is solved by a method for controlling a cleaning system for motor vehicle components, the cleaning system comprising a fluid delivery device, a pressure sensor for determining a pressure generated by the fluid delivery device and a fluid distribution device with at least one inlet port fluidly connected to the fluid delivery device and with at least two outlet ports fluidly connected to the inlet port, wherein each output port is adjustable between an open position and a closed position, at least two cleaning devices each fluidly connected via a fluid line to a respective output port, and a control device which is data-coupled to the fluid delivery device and the fluid distribution device for transmitting and/or receiving signals. The method according to the invention comprises the following method steps:

determining a cleaning request for all cleaning devices;
   determining a pressure setpoint for at least one first cleaning device;
   adjusting the output ports of the fluid distribution device in their open position or in their closed position according to the cleaning request;
   determining of an actual fluid pressure generated by the fluid delivery device;
   determining a total flow rate delivered by the fluid delivery device based on the actual fluid pressure;
   determining a first flow rate through the first cleaning device based on the total flow rate;
   determining a first pressure loss in a line path via which the first cleaning device is fluidly connected to the fluid delivery device, taking into account the first flow rate;
   determining a pressure control value based on the pressure setpoint and the first pressure loss; and
   adjusting of the fluid delivery device in such a way that a fluid pressure provided by the fluid delivery device is changed in the direction of the pressure control value.

The method according to the invention has the advantage that a cleaning system for motor vehicle components can be considerably simplified. In particular, the cleaning system can enable a considerably reduced number of monitoring devices for monitoring cleaning pressures and/or cleaning quantities, which must be provided by the individual cleaning devices of the cleaning system in order to ensure a required cleaning result. This is because the method enables a cleaning pressure to be determined centrally at one point in the cleaning system, with the cleaning pressures or cleaning quantities at the respective cleaning devices being calculated on an interpolated basis.

The vehicle components can, for example, be designed as vehicle sensors or have vehicle sensors, which in turn can have optical sensors, for example. For example, the vehicle sensors can have at least one camera and/or at least one lidar sensor. Furthermore, the vehicle sensors can have a radar sensor. The motor vehicle components can also be designed as, for example, windscreens, rear windows, headlights, rear lights, warning lights and/or other lighting devices or have these.

The fluid delivery device can also be referred to as a fluid pump or simply as a pump. The fluid delivery device has at least one fluid inlet port via which the fluid delivery device is supplied with a cleaning fluid. For example, the fluid delivery device is fluidly connected to a cleaning container by means of the fluid inlet port, whereby a cleaning fluid can be filled into the cleaning container. The fluid delivery device also has at least one fluid output port via which the cleaning fluid can be output under pressure.

The fluid delivery device can also have two or more than two fluid output ports, each of which is preferably adjustable between an open position and a closed position.

The fluid distribution device is used to distribute the cleaning fluid provided by the fluid delivery device for the cleaning devices of the cleaning system. The fluid distribution device can also be referred to as a valve block.

In the open position of an output port of the fluid distribution device, fluid delivery from the input port of the fluid distribution device through the respective output port is enabled, whereas in the closed position of an output port, fluid delivery from the input port through the respective output port is prevented. Preferably, the respective output ports can be adjusted discretely between their open position and their closed position, i.e. in the open position of an output port, it is completely open, whereas in the closed position of an output port, it is completely closed.

The fluid distribution device preferably has more than two output ports. For example, the fluid distribution device has three, four, five, six or more output ports. According to the invention, there are no restrictions with regard to the number of output ports.

The cleaning devices are preferably designed as cleaning nozzles. Preferably, the cleaning system has a number of cleaning devices corresponding to the number of output ports.

Each cleaning device can be fluidly connected to an output port of the fluid distribution device via a respective line path, which can also be referred to as a fluid line. For example, a first cleaning device can be fluidly connected to a first output port by means of a first line path, a second cleaning device can be fluidly connected to a second output port by means of a second line path and so on.

The cleaning fluid or the fluid is preferably a liquid, for example water and/or a cleaning solution. Consequently, the fluid delivery device can also be referred to as a liquid delivery device or a liquid pump.

The control device is preferably also data-coupled with the pressure sensor for transmitting and/or receiving signals.

Preferably, the fluid delivery device is data-coupled with the pressure sensor for transmitting and/or receiving signals.

In the process step of determining the cleaning request for all cleaning devices, request information is determined which contains information on which output port are to be opened. This means that the request information contains information about which of the vehicle components are to be cleaned. Furthermore, the cleaning request contains information about the fluid pressure to be dispensed from the respective cleaning devices and optionally the duration of how long cleaning fluid is to be dispensed from the respective cleaning devices. For example, the cleaning request is determined by receiving it.

For example, the cleaning request may contain information that a first vehicle sensor is to be supplied with cleaning fluid at a fluid pressure of 3 bar for a period of one second, a second vehicle sensor is to be supplied with no cleaning fluid and a third vehicle sensor is to be supplied with cleaning fluid at a fluid pressure of 2.7 bar for a period of two seconds.

The pressure at the cleaning nozzle automatically determines the flow rate through the cleaning nozzle.

In the process step of determining a pressure setpoint for at least one first cleaning device, this pressure setpoint is reached during the iterative execution of the process. The pressure setpoint can be determined by reading out the cleaning request.

In the process step of determining a pressure setpoint for at least one first cleaning device, a plurality of pressure setpoints can preferably be determined. Based on this plurality of pressure setpoints, a pressure setpoint can be calculated, which serves as the basis for the further process steps. For example, an average value of determined pressure setpoints can be used as the pressure setpoint.

The pressure setpoint determined by averaging the pressure setpoints can also be referred to as the target pressure setpoint.

In the process step of setting the output ports of the fluid distribution device in their open position or in their closed position, the output ports are preferably transferred discretely into their open position or into their closed position. This means that there are preferably no intermediate positions of the respective output ports. If, for example, a cleaning request is determined according to which a first vehicle sensor and a third vehicle sensor, but not a second vehicle sensor, are to be cleaned, the first and third output ports are transferred to their respective open positions and the second output port is transferred to its closed position.

The three process steps described above are preferably carried out once for each cleaning job or until a cleaning job is completed. The process steps described below are preferably carried out as often as necessary until a difference between the first pressure setpoint and the fluid pressure provided by the fluid delivery device falls below a predetermined limit value.

In the process step for determining the actual fluid pressure, the fluid pressure generated by the fluid delivery device is determined at the time of determination. As the iteration steps of the process progress, the actual fluid pressure is equalized to a control setpoint, whereby the control setpoint is obtained by adding the pressure setpoint (target pressure setpoint) and the first pressure loss. The actual fluid pressure is determined by means of the pressure sensor.

The total flow rate delivered by the fluid delivery device is proportional to the actual fluid pressure, so that the total flow rate can be determined based on the actual fluid pressure.

The total flow rate is preferably determined by calculating the total flow rate.

The determination of the first flow rate through the first cleaning device is dependent on the total flow rate provided by the fluid delivery device, which is divided between the cleaning devices that are assigned to an output port of the fluid distribution device that is in the open position. It is therefore possible to determine the first flow rate through the first cleaning device based on the total flow rate.

In the process step of determining the first flow rate by the first cleaning device, at least one further flow rate can also be determined by at least one further cleaning device based on the total flow rate.

The determination of the first pressure loss is dependent on the first flow rate through the first cleaning device. The line path, via which the first cleaning device is fluidly connected to the fluid delivery device, more specifically to the fluid output port of the fluid delivery device, has, for example, a collecting fluid line from the fluid output port to the fluid distribution device, the fluid distribution device, a first fluid line, via which a first output port of the fluid distribution device is fluidly connected to the first cleaning device, and the first fluid distribution device. The first pressure loss is preferably determined by means of a calculation.

In the process step for determining or calculating the pressure control value, the pressure value that the fluid delivery device should generate is determined so that cleaning fluid can be dispensed from the first cleaning device at the pressure setpoint. The pressure control value is calculated, for example, by adding the pressure setpoint and the first pressure loss.

In the process step of adjusting the fluid delivery device in such a way that a fluid pressure provided by the fluid delivery device is changed in the direction of the pressure control value, a power level of the fluid delivery device is adjusted accordingly. The power level of the fluid delivery device can, for example, be a rotational speed of the fluid delivery device.

Preferably, the method is designed such that the method step of determining a total flow rate conveyed by the fluid delivery device is carried out using power level information of the fluid delivery device.

The advantage of the correspondingly designed method is that the total flow rate delivered by the fluid delivery device can be determined with improved accuracy.

The power level of the fluid delivery device can, for example, be a rotational speed of the fluid delivery device. In certain fluid delivery devices, a rotational speed of the fluid delivery device is proportional to the fluid flow rate that can be delivered by means of the fluid delivery device. For example, in the case of fluid delivery devices designed as centrifugal pumps or as brushless DC pumps, the speed of the DC pump is proportional to the fluid flow rate that can be delivered by the DC pump.

Preferably, the method is designed such that the method step of determining a total flow rate which is delivered by the fluid delivery device is carried out using a characteristic diagram of the fluid delivery device which indicates the total flow rate which can be achieved by the fluid delivery device as a function of the fluid pressure for different power levels of the fluid delivery device.

The advantage of the correspondingly designed method is that the total flow rate delivered by the fluid delivery device can be determined with improved accuracy and more quickly.

Preferably, the method is designed in such a way that the fluid delivery device is set to the lowest power level at which the pressure control value can be achieved by the fluid delivery device.

The advantage of the correspondingly designed process is that the fluid delivery device is not unnecessarily operated at excessively high power levels. Further, this reduces energy consumption and lowers the noise level of the fluid delivery device.

Preferably, the method is designed such that the method step of determining the first flow rate through the first cleaning device is also carried out based on switching positions of the output ports of the fluid distribution device.

The advantage of the correspondingly designed method is that the first flow rate is determined with increased accuracy by the first cleaning device. The control accuracy of the correspondingly designed method is thus considerably improved.

The cleaning fluid delivered by the fluid delivery device is divided between the line paths in which the output ports of the fluid distribution device assigned to these line paths are located in their respective open positions. The total flow rate is divided according to the flow resistances of the line paths located downstream of the output ports. If, for example, a flow resistance of a line path assigned to the first cleaning device is smaller than a flow resistance of a line path assigned to the third cleaning device, then a cleaning fluid flow through the line path assigned to the first cleaning device will be greater than a flow rate of the cleaning fluid flow through the line path assigned to the third cleaning device.

Preferably, the method is designed such that the method step of determining the first flow rate through the first cleaning device is also carried out based on a first conversion table which indicates the ratios of the flow rates through the line paths assigned to the respective cleaning devices as a function of fluid pressures provided by the fluid delivery device.

The correspondingly designed method has the advantage that the flow rate is determined by the first cleaning device with a reduced computational effort. This is because the first conversion table, which can also be referred to as the first lookup table, is preferably stored in the control device or in another electronic memory, so that the ratios of the flow rates do not always have to be recalculated for each iteration step of the method.

In the first conversion table, the ratios of the flow rates through the line paths assigned to the respective cleaning devices are specified for a large number of fluid pressures provided by the fluid delivery device. These ratios of the flow rates through the line paths assigned to the respective cleaning devices are preferably standardized to the line path that has the lowest flow rate at a specified pressure among all line paths. This line path is preferably normalized to 1, so that the flow rates through the other line paths are correspondingly greater than 1 in each case.

The following is an example of a corresponding first conversion table:

| Actual fluid pressure | Flow through first cleaning device | Flow through second cleaning device | Flow through third cleaning device |
|---|---|---|---|
| 2.5 bar | 2.54 | 1.68 | 1 (reference) |
| 3 bar | 2.7 | 1.75 | 1 (reference) |
| 3.5 bar | 2.8 | 1.85 | 1 (reference) |
| 4 bar | 2.9 | 1.9 | 1 (reference) |

According to this exemplary first conversion table, at an actual fluid pressure of 3.5 bar generated by the fluid delivery device, 2.8 times as much cleaning fluid flows through the first cleaning device as through the third cleaning device. 1.85 times as much cleaning fluid flows through the second cleaning device as through the third cleaning device.

Preferably, the method is designed such that the method step of determining the first flow rate by the first cleaning device is also carried out based on at least one second conversion table, wherein in a second conversion table the percentage flow rates through the line paths assigned to the respective cleaning devices are specified for all permutations of switching positions of all output ports of the fluid distribution device for a fluid pressure provided by the fluid delivery device.

The correspondingly designed method has the advantage that the flow rate is determined by the first cleaning device with a reduced computational effort. This is because the second conversion table, which can also be referred to as the second lookup table, is preferably stored in the control device or in another electronic memory, so that the ratios of the flow rates do not always have to be recalculated for each iteration step of the method.

Preferably, a second conversion table is available for each of a plurality of fluid pressures provided by the fluid delivery device and stored in the control device or in another electronic memory.

For each permutation of the switching positions of all output ports of the fluid distribution device, the sum of the percentage flow rates through the line paths assigned to the respective cleaning devices is always 100% of the total flow rate delivered by the fluid delivery device.

Both the first conversion table and all second conversion tables can be determined using a computer simulation in which the cleaning system is digitized. It is also possible for the first conversion table and all second conversion tables to be determined using preliminary measurements on the actual cleaning system.

An example of a corresponding second conversion table for an actual fluid pressure of 3.5 bar is given below:

| first output port | second output port | third output port |
|---|---|---|
| 0 | 0 | 100 |
| 0 | 100 | 0 |
| 0 | 66 | 33 |
| 100 | 0 | 0 |
| 80 | 0 | 20 |
| 66 | 33 | 0 |
| 57.1 | 28.6 | 14.3 |

According to this exemplary second conversion table, for example, at an actual fluid pressure of 3.5 bar generated by the fluid delivery device, with the first and second output ports in the closed position and the third output port open, 100% of the total fluid flow flows through the third output port (first line of the second conversion table corresponding to a first switching permutation).

According to the third line (corresponding to a third switching permutation) of the second conversion table above, 66% of the total fluid flow flows through the second output port and 33% through the third output port when the first output port is in the closed position and the second and third output ports are in the open position.

According to the seventh line (corresponding to a seventh switching permutation) of the second conversion table above, 57.1% of the total fluid flow flows through the first output port, 28.6% of the total fluid flow flows through the second output port and 14.3% flows through the third output port when all output ports are in the open position.

Preferably, the method is designed such that the method step of determining the first pressure loss also takes into account the total flow rate delivered by the fluid delivery device.

The advantage of the correspondingly designed method is that the first flow rate is determined with increased accuracy by the first cleaning device. The control accuracy of the correspondingly designed method is thus considerably improved. Furthermore, the correspondingly designed method achieves more efficient cleaning of the vehicle components and reduces fluid consumption and energy requirements.

The cleaning fluid delivered by the fluid delivery device is divided into the line paths in which the output ports of the fluid distribution device assigned to these line paths are in their respective open positions. Before the cleaning fluid is distributed to the respective line paths, the cleaning fluid passes through a collecting line located between the fluid delivery device and the fluid distribution device, which also contributes to the first pressure loss. Consequently, the total flow delivered by the fluid delivery device passes through this manifold.

Preferably, the method is designed such that during the method step of determining at least one pressure setpoint for at least one first cleaning device, at least one further pressure setpoint for at least one second cleaning device is additionally determined and a value calculated on the basis of these determined pressure setpoints is adopted as the pressure setpoint.

The correspondingly designed method has the advantage that, in the case of a cleaning request for more than one motor vehicle component, at least two of the motor vehicle components are acted upon with the cleaning fluid at fluid pressures at least approximately corresponding to the respective pressure setpoints, so that a cleaning result for a plurality of motor vehicle components is improved.

For example, the value based on the determined pressure setpoints, which is adopted as the pressure setpoint, is calculated by averaging the determined pressure setpoints.

The present invention is also based on the task of providing a cleaning system which is less error-prone and less cost-intensive.

This task underlying the present invention is solved by a cleaning system with the features of claim 10.

In more detail, this problem underlying the present task is solved by a cleaning system comprising a fluid delivery device, a pressure sensor for determining a pressure generated by the fluid delivery device and a fluid distribution device with at least one inlet port fluidly connected to the fluid delivery device and with at least two outlet ports fluidly connected to the inlet port, wherein each output port is adjustable between an open position and a closed position, at least two cleaning devices each fluidly connected via a fluid line to a respective output port, and a control device which is data-coupled to the fluid delivery device and the fluid distribution device for transmitting and/or receiving signals. The cleaning system according to the invention is characterized in that the control device is designed to carry out one of the methods described above.

The cleaning system according to the invention has the advantage that it has a reduced number of components and is thus simplified. More precisely, the cleaning system according to the invention has a considerably reduced number of monitoring devices for monitoring cleaning pressures and/or cleaning quantities that must be provided by the individual cleaning devices of the cleaning system in order to ensure a required cleaning result. Thus, the cleaning system according to the invention is less error-prone and less cost-intensive.

The vehicle components can, for example, be designed as vehicle sensors or have vehicle sensors, which in turn can have optical sensors, for example. For example, the vehicle sensors can have at least one camera and/or at least one lidar sensor. Furthermore, the vehicle sensors can have a radar sensor. The motor vehicle components can also be designed as, for example, windscreens, rear windows, headlights, rear lights, warning lights and/or other lighting devices or have these.

The fluid delivery device can also be referred to as a fluid pump or simply as a pump. The fluid delivery device has at least one fluid inlet port via which the fluid delivery device is supplied with a cleaning fluid. For example, the fluid delivery device is fluidly connected to a cleaning container by means of the fluid inlet port, whereby a cleaning fluid can be filled into the cleaning container. The fluid delivery device also has at least one fluid output port via which the cleaning fluid can be output under pressure.

The fluid delivery device can also have two or more than two fluid output ports, each of which is preferably adjustable between an open position and a closed position.

The fluid distribution device is used to distribute the cleaning fluid provided by the fluid delivery device for the cleaning devices of the cleaning system. The fluid distribution device can also be referred to as a valve block.

In the open position of an output port of the fluid distribution device, fluid delivery from the input port of the fluid distribution device through the respective output port is enabled, whereas in the closed position of an output port, fluid delivery from the input port through the respective output port is prevented. Preferably, the respective output ports can be adjusted discretely between their open position and their closed position, i.e. in the open position of an output port, it is completely open, whereas in the closed position of an output port, it is completely closed.

The fluid distribution device preferably has more than two output ports. For example, the fluid distribution device has three, four, five, six or more output ports. According to the invention, there are no restrictions with regard to the number of output ports.

The cleaning devices are preferably designed as cleaning nozzles. Preferably, the cleaning system has a number of cleaning devices corresponding to the number of output ports. In the case of a motor vehicle component designed as a windshield, for example, several cleaning devices are fluidly connected to an output port.

Each cleaning device can be fluidly connected to an output port of the fluid distribution device via a respective line path, which can also be referred to as a fluid line. For example, a first cleaning device can be fluidly connected to a first output port by means of a first line path, a second cleaning device can be fluidly connected to a second output port by means of a second line path and so on.

The cleaning fluid or the fluid is preferably a liquid, for example water and/or a cleaning solution. Consequently, the fluid delivery device can also be referred to as a liquid delivery device or a liquid pump.

The control device is preferably also data-coupled with the pressure sensor for transmitting and/or receiving signals.

Preferably, the fluid delivery device is data-coupled with the pressure sensor for transmitting and/or receiving signals.

Preferably, the control device is designed as part of the fluid delivery device and/or integrated into it.

The present invention is also based on the task of providing a motor vehicle which enables improved cleaning of motor vehicle components while at the same time reducing the number of components.

This task underlying the present invention is solved by a motor vehicle with the features of claim 11.

Figure 2:
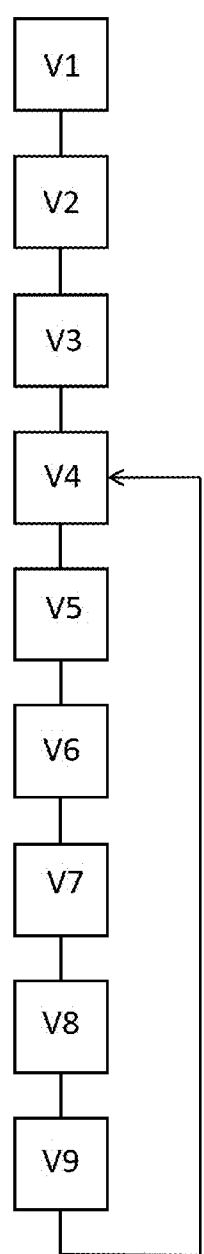
Figure 3:
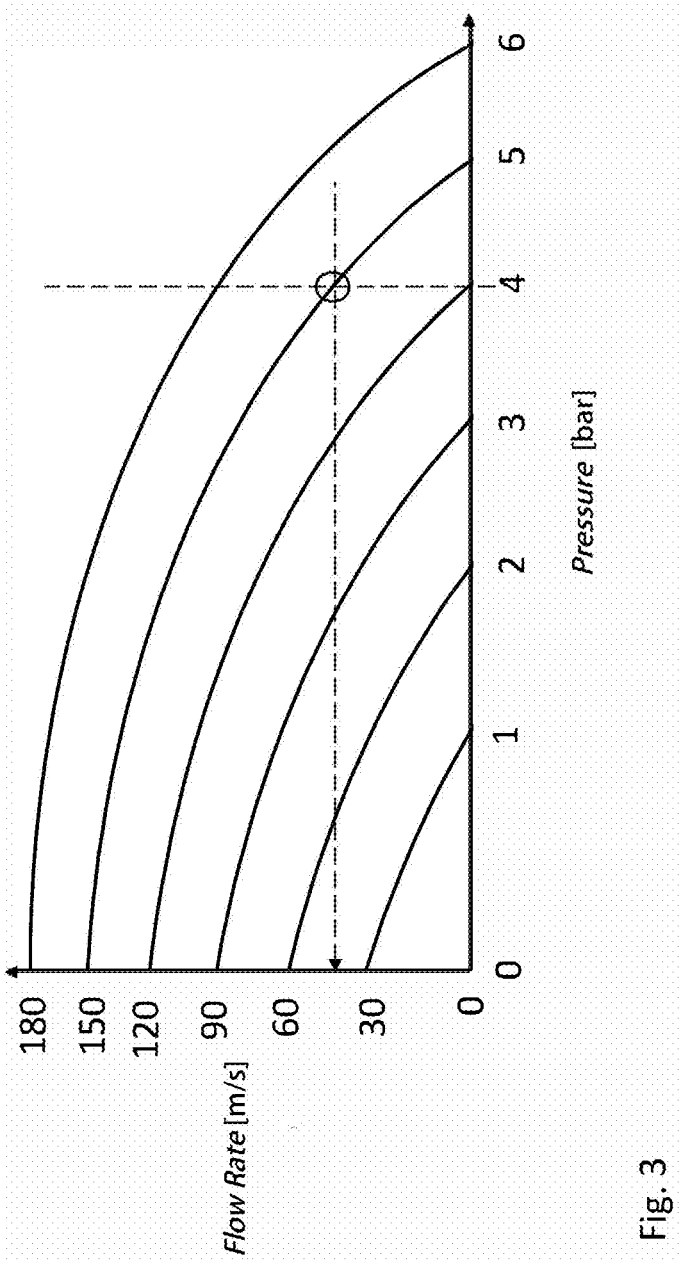
Figure 4:
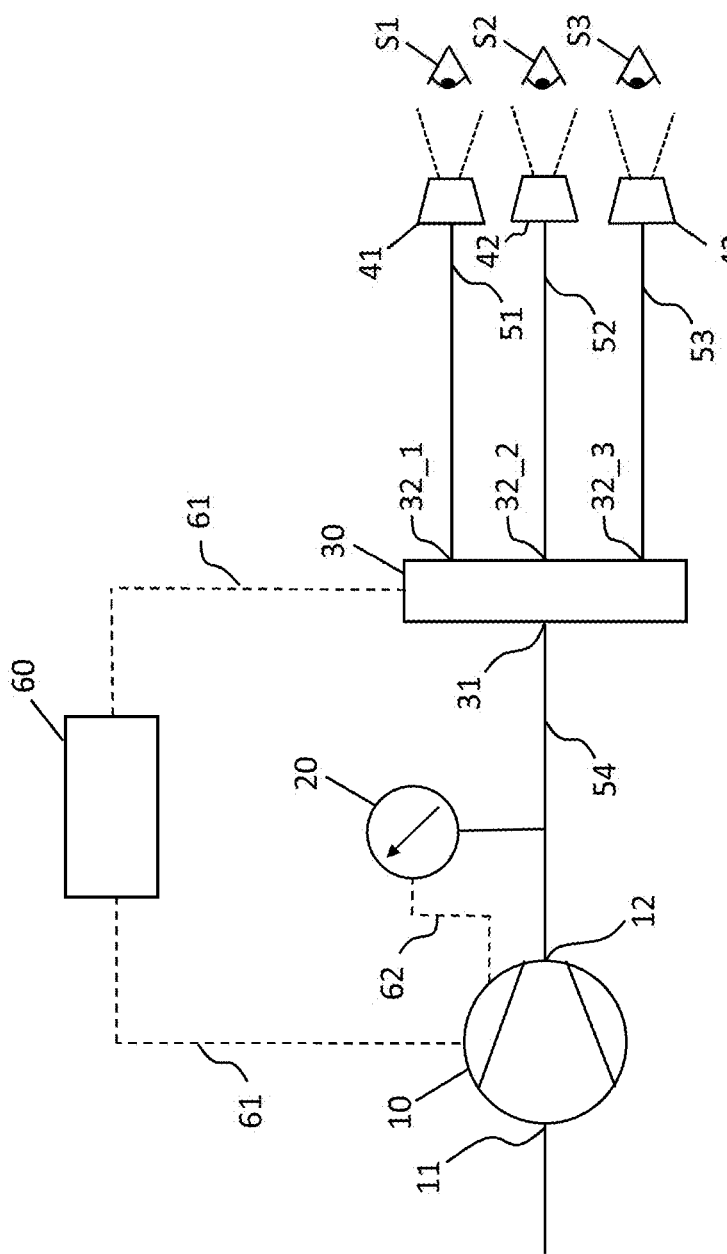

Further advantages, details and features of the invention are shown in the following embodiments. These show in detail:

FIG. 1: a schematic representation of the cleaning system according to the invention;

FIG. 2: a flow diagram of a method according to the invention for controlling a cleaning system shown in FIG. 1;

FIG. 3: a characteristic diagram of the fluid conveying device, which indicates the total flow rate achievable by the fluid delivery device as a function of the fluid pressure for different power levels of a fluid delivery device; and FIG. 4: a schematic representation of a cleaning system according to a further embodiment of the present invention.

In the following description, the same reference signs denote the same components or the same features, so that a description carried out in relation to one figure with regard to a component also applies to the other figures, so that a repetitive description is avoided. Furthermore, individual features described in connection with one embodiment can also be used separately in other embodiments.

FIG. 1 shows a schematic representation of a cleaning system according to the invention for motor vehicle components S1, S2, S3, which are designed as motor vehicle sensors S1, S2, S3 in the embodiment described below. However, the present invention is not limited to the fact that the motor vehicle components are designed as motor vehicle sensors or have them. The motor vehicle components may also be formed as or comprise windshields, rear windows, headlights, taillights, warning lights and/or lighting devices in general. The motor vehicle sensors S1, S2, S3 may, for example, have optical sensors. For example, the motor vehicle sensors S1, S2, S3 may have at least one camera and/or at least one lidar sensor. Furthermore, the vehicle sensors S1, S2, S3 can have a radar sensor. In the illustrated embodiment, the cleaning system 3 comprises vehicle sensors S1, S2, S3, however, the present invention is not limited to this number of vehicle sensors, the cleaning system according to the invention may comprise two or more (for example four, five, six, or more) vehicle sensors.

The cleaning system has a fluid delivery device 10, which is also referred to as fluid pump 10 or simply pump 10. The fluid delivery device 10 has at least one fluid inlet port 11, via which the fluid delivery device 10 is supplied with a cleaning fluid. For example, the fluid delivery device 10 is fluidly connected by means of the fluid inlet port 11 to a cleaning container not shown in the figures, whereby a cleaning fluid can be filled into the cleaning container. The fluid delivery device 10 also has at least one fluid output port 12, via which the cleaning fluid can be output under pressure.

The cleaning system further comprises a fluid distribution device 30 with at least one input port 31 fluidly connected to the fluid delivery device 10, wherein the input port 31 of the fluid distribution device 30 is fluidly connected to the fluid output port 12 of the fluid delivery device 10 by means of a collecting fluid line 54. The fluid distribution device 30 further comprises at least two output ports 32_1, 32_2, 32_3 fluidly connected to the input port 31. In the illustrated embodiment example, the fluid distribution device 30, which may also be referred to as a valve block 30, has three output ports 32_1, 32_2, 32_3. However, the fluid distribution device 30 may also have more than three output ports. Each of the output ports 32_1, 32_2, 32_3 is adjustable between an open position and a closed position. In the open position of an output port 32_1, 32_2, 32_3, fluid delivery from the input port 31 of the fluid distribution device 30 through the relevant output port 32_1, 32_2, 32_3 is enabled, whereas in the closed position of an output port 32_1, 32_2, 32_3, fluid delivery from the input port 31 through the relevant output port 32_1, 32_2, 32_3 is prevented.

The cleaning system also has a pressure sensor 20 for determining a pressure generated by the fluid delivery device 10.

Furthermore, the cleaning system has at least two cleaning devices 41, 42, 43, each fluidly connected via a fluid line 51, 52, 53 to a respective output port 32_1, 32_2, 32_3. In the embodiment shown, the cleaning system has three cleaning devices 41, 42, 43, but the cleaning system can also have more than three (for example four, five, six or more) cleaning devices 41, 42, 43. In the embodiment shown, the cleaning devices 41, 42, 43 are designed as cleaning nozzles 41, 42, 42. The cleaning devices 41, 42, 43 are designed to dispense or spray the cleaning fluid delivered by the fluid delivery device 10 onto the vehicle sensors S1, S2, S3. In the illustrated embodiment example, one cleaning device 41, 42, 43 is assigned to each vehicle sensor S1, S2, S3.

Furthermore, the cleaning system has a control device 60, which is data-coupled via a data line 61 or signal line 61 to the fluid delivery device 10, the pressure sensor 20 and the fluid distribution device 30 for transmitting and/or receiving signals. The control device 60 is designed to receive data determined by the pressure sensor 20. Furthermore, the control device 60 is designed to receive data transmitted by the fluid delivery device 10, which represents the power level of the fluid delivery device 10. Furthermore, the control device 60 is designed to transmit control signals to the fluid delivery device 10 for setting the power level of the fluid delivery device 10. Furthermore, the control device is designed to receive data transmitted by the fluid distribution device 30, which represent the switching positions of the output connections 32_1, 32_2, 32_3. Furthermore, the control device 60 is designed to transmit control signals to the fluid distribution device 30 for adjusting the switching positions of the output connections 32_1, 32_2, 32_3.

The control device 60 is designed to carry out the process steps shown in FIG. 2 and described below.

In a process step V1, a cleaning request is determined for all cleaning devices 41, 42, 43. The cleaning request contains information about which vehicle sensor S1, S2, S3 is to be cleaned. Consequently, the cleaning request contains information on which cleaning device 41, 42, 42 is to be activated. Furthermore, the cleaning request contains information about how high the fluid pressure should be at the outlets of the cleaning devices 41, 42, 43. Furthermore, the cleaning request can contain information on the duration for which the cleaning devices should dispense cleaning fluid.

In a method step V2, at least one pressure setpoint is determined for at least one first cleaning device 41, 42, 43. It is also possible that in process step V2, at least one further pressure setpoint is additionally determined for at least one second cleaning device 41, 42, 43 and an average value of the determined pressure setpoints is adopted as the pressure setpoint (target pressure setpoint).

In a process step V3, the output connections 32_1, 32_2, 32_3 of the fluid distribution device 30 are set in their open position or in their closed position according to the cleaning requirement.

In a process step V4, an actual fluid pressure generated by the fluid delivery device 10 is determined by means of the pressure sensor 20. The fluid pressure generated by the fluid delivery device 10 is determined at the time of the determination. As the iteration steps of the method progress, the actual fluid pressure is equalized to a control setpoint, whereby the control setpoint is obtained by adding the pressure setpoint and the first pressure loss.

In a method step V5, a total flow rate delivered by the fluid delivery device 10 is determined based on the actual fluid pressure. The total flow rate delivered by the fluid delivery device 10 is proportional to the actual fluid pressure, so that the total flow rate can be determined based on the actual fluid pressure.

In the method step V5 for determining a total flow rate delivered by the fluid delivery device 10, this can be done using power level information of the fluid delivery device 10. In the case of a fluid delivery device 10 designed, for example, as a brushless DC pump 10, a rotational speed of the pump 10 is a power level of the pump 10.

In method step V5 for determining a total flow rate which is delivered by the fluid delivery device 10, this can be carried out using a characteristic diagram of the fluid delivery device 10 shown in FIG. 3, which indicates the total flow rate which can be achieved by the fluid delivery device 10 as a function of the fluid pressure for different power levels of the fluid delivery device 10.

FIG. 3 shows that higher fluid pressures and a higher flow rate can be realized by the fluid delivery device 10 as the power level increases.

In a method step V6, a first flow rate is determined through the first cleaning device 41, 42, 43 based on the total flow rate. The determination of the first flow rate through the first cleaning device 41, 42, 42 is dependent on the total flow rate provided by the fluid delivery device 10, which is divided between the cleaning devices 41, 42, 43 that are associated with an output port 32_1, 32_2, 32_3 of the fluid distribution device 30 that is in the open position. Therefore, it is possible to determine the first flow rate through the first cleaning device 41, 42, 43 based on the total flow rate.

If in process step V2 an additional pressure setpoint is determined by at least one second cleaning device 41, 42, 42 and an average value of the determined pressure setpoints is adopted as the pressure setpoint (target pressure setpoint), then in process step V6 of determining the first flow rate through the first cleaning device 41, 42, 43, at least one further flow rate can additionally be determined through at least one further cleaning device 41, 42, 43 based on the total flow rate.

In method step V6 of determining the first flow rate through the first cleaning device 41, 42, 43 and, if necessary, further flow rates through the further cleaning devices 41, 42, 43, their determination is also based on switching positions of the output connections 32_1, 32_2, 32_3 of the fluid distribution device 30.

This is because the cleaning fluid delivered by the fluid delivery device 10 is divided between the line paths in which the output ports 32_1, 32_2, 32_3 of the fluid distribution device 30 assigned to these line paths are located in their respective open positions. The total flow rate is divided according to the flow resistances of the line paths located downstream of the output ports 32_1, 32_2, 32_3.

In a method step V7, a first pressure loss in a line path 54, 30, 51, 52, 53, 41, 42, 43, via which the first cleaning device 41, 42, 43 is fluidly connected to the fluid delivery device 10, is determined taking into account the first flow rate.

If in process step V2 an additional pressure setpoint is determined by at least one second cleaning device 41, 42, 42 and an average value of the determined pressure setpoints is adopted as the pressure setpoint (target pressure setpoint), then in process step V7 at least a second pressure loss in a line section 54, 30, 51, 52, 53, 41, 42, 43, via which the further cleaning device 41, 42, 43 is fluidly connected to the fluid delivery device 10, can also be determined, taking into account the first flow rate.

The determination of a pressure loss is dependent on the flow rate through the corresponding cleaning device 41, 42, 43. The line path via which the corresponding cleaning device 41, 42, 43 is fluidly connected to the fluid delivery device 10, in more detail to the fluid output port 12 of the fluid delivery device 10, has, for example, a collecting fluid line 54 from the fluid output port 12 to the fluid distribution device 30, the fluid distribution device 30, a fluid line via which an output port 32_1, 32_2, 32_3 of the fluid distribution device 30 is fluidly connected to the corresponding cleaning device 41, 42, 43, and the corresponding fluid distribution device 41, 42, 43.

The process step V7 of determining the first pressure loss or the multiple pressure losses is also carried out taking into account the total flow rate delivered by the fluid delivery device 10.

This is because the cleaning fluid delivered by the fluid delivery device 10 is divided into the line paths in which the output ports 32_1, 32_2, 32_3 of the fluid distribution device 30 assigned to these line paths are in their respective open positions. Before the cleaning fluid is distributed to the respective line paths, the cleaning fluid passes through the collecting line 54 located between the fluid delivery device 10 and the fluid distribution device 30, which also contributes to the first pressure loss. Consequently, the total flow delivered by the fluid delivery device 10 passes through this manifold 54.

In a method step V8, a pressure control value is determined based on the pressure setpoint (target pressure setpoint) and the first pressure loss. In process step V8 for determining or calculating the pressure control value, the pressure value that the fluid delivery device 10 should generate is determined so that cleaning fluid can be dispensed from the first cleaning device 41, 42, 43 at the pressure setpoint. The pressure control value is calculated, for example, by adding the pressure setpoint and the first pressure loss.

In a process step V9, the fluid delivery device 10 is adjusted in such a way that a fluid pressure provided by the fluid delivery device 10 is changed in the direction of the pressure control value.

Process steps V1 to V3 are only carried out once for each cleaning request, whereas process steps V4 to V9 are carried out as often as necessary until the actual fluid pressure has approached a predetermined distance from the pressure control value.

FIG. 4 shows a schematic representation of a cleaning system according to a further embodiment of the present invention. The cleaning system shown in FIG. 4 essentially corresponds to the cleaning system shown in FIG. 1, with the exception that the control device 60 is only data-coupled to the fluid delivery device 10 and to the fluid distribution device 30 via data lines 61 for transmitting and/or receiving signals, but not to the pressure sensor 20. On the other hand, in the cleaning system shown in FIG. 4, the fluid delivery device 10 is data-coupled to the pressure sensor 20 by means of a data line or signal line 62 for transmitting and/or receiving signals. The fluid delivery device 10 is designed to receive data determined by the pressure sensor 20.

The remaining structure of the cleaning system shown in FIG. 4 corresponds to that of the cleaning system shown in FIG. 1, so that reference is made to the above description in order to avoid repetition.

The control device 60 and/or the fluid delivery device 10 are designed to carry out the process steps V1 to V9 shown in FIG. 2 and described below.

In process step V1, a cleaning request is determined for all cleaning devices 41, 42, 43. The cleaning request contains information about which vehicle sensor S1, S2, S3 is to be cleaned. Consequently, the cleaning request contains information on which cleaning device 41, 42, 42 is to be activated. Furthermore, the cleaning request contains information about how high the fluid pressure should be at the outlets of the cleaning devices 41, 42, 43. Furthermore, the cleaning request can contain information on the duration for which the cleaning devices should dispense cleaning fluid. This process step is carried out by the control device 60.

In process step V2, at least one pressure setpoint is determined for at least one first cleaning device 41, 42, 43. It is also possible that in process step V2, at least one further pressure setpoint is additionally determined for at least one second cleaning device 41, 42, 43 and an average value of the determined pressure setpoints is adopted as the pressure setpoint (target pressure setpoint). This process step is carried out either by the control device 60 or by the fluid delivery device 10.

In process step V3, the output ports 32_1, 32_2, 32_3 of the fluid distribution device 30 are set in their open position or in their closed position according to the cleaning requirement. This process step is carried out by the control unit 60.

In process step V4, an actual fluid pressure generated by the fluid delivery device 10 is determined by means of the pressure sensor 20. The fluid pressure generated by the fluid delivery device 10 is determined at the time of the determination. As the iteration steps of the method progress, the actual fluid pressure is equalized to a control setpoint, whereby the control setpoint is obtained by adding the pressure setpoint and the first pressure loss. This process step is carried out by the fluid delivery device 10.

In process step V5, a total flow rate that is delivered by the fluid delivery device 10 is determined based on the actual fluid pressure. The total flow rate delivered by the fluid delivery device 10 is proportional to the actual fluid pressure, so that the total flow rate can be determined based on the actual fluid pressure. This process step is carried out either by the control device 60 or by the fluid delivery device 10.

In the method step V5 for determining a total flow rate delivered by the fluid delivery device 10, this can be done using power level information of the fluid delivery device 10. In the case of a fluid delivery device 10 designed, for example, as a brushless DC pump 10, a rotational speed of the pump 10 is a power level of the pump 10.

In method step V5 for determining a total flow rate delivered by the fluid delivery device 10, this can be carried out using the characteristic diagram of the fluid delivery device 10 shown in FIG. 3, which is already described above.

In process step V6, a first flow rate is determined through the first cleaning device 41, 42, 43 based on the total flow rate. The determination of the first flow rate through the first cleaning device 41, 42, 42 is dependent on the total flow rate provided by the fluid delivery device 10, which is divided between the cleaning devices 41, 42, 43 that are associated with an output port 32_1, 32_2, 32_3 of the fluid distribution device 30 that is in the open position. Therefore, it is possible to determine the first flow rate through the first cleaning device 41, 42, 43 based on the total flow rate. This process step is carried out either by the control device 60 or by the fluid delivery device 10.

If in process step V2 an additional pressure setpoint is determined by at least one second cleaning device 41, 42, 42 and an average value of the determined pressure setpoints is adopted as the pressure setpoint (target pressure setpoint), then in process step V6 of determining the first flow rate through the first cleaning device 41, 42, 43, at least one further flow rate can additionally be determined through at least one further cleaning device 41, 42, 43 based on the total flow rate.

In method step V6 of determining the first flow rate through the first cleaning device 41, 42, 43 and, if necessary, further flow rates through the further cleaning devices 41, 42, 43, their determination is also based on switching positions of the output ports 32_1, 32_2, 32_3 of the fluid distribution device 30.

This is because the cleaning fluid delivered by the fluid delivery device 10 is divided between the line paths in which the output ports 32_1, 32_2, 32_3 of the fluid distribution device 30 assigned to these line paths are in their respective open positions. The total flow rate is divided according to the flow resistances of the line paths located downstream of the output ports 32_1, 32_2, 32_3.

In process step V7, a first pressure loss is determined in a line path 54, 30, 51, 52, 53, 41, 42, 43, via which the first cleaning device 41, 42, 43 is fluidly connected to the fluid delivery device 10, taking into account the first flow rate. This process step is carried out either by the control device 60 or by the fluid delivery device 10.

If in process step V2 an additional pressure setpoint is determined by at least one second cleaning device 41, 42, 42 and an average value of the determined pressure setpoints is adopted as the pressure setpoint (target pressure setpoint), then in process step V7 at least a second pressure loss in a line path 54, 30, 51, 52, 53, 41, 42, 43, via which the further cleaning device 41, 42, 43 is fluidly connected to the fluid delivery device 10, can also be determined, taking into account the first flow rate.

The process step V7 of determining the first pressure loss or the multiple pressure losses also takes into account the total flow rate delivered by the fluid delivery device 10.

This is because the cleaning fluid delivered by the fluid delivery device 10 is divided into the line paths in which the output ports 32_1, 32_2, 32_3 of the fluid distribution device 30 assigned to these line paths are in their respective open positions. Before the cleaning fluid is distributed to the respective line paths, the cleaning fluid passes through the collecting line 54 located between the fluid delivery device 10 and the fluid distribution device 30, which also contributes to the first pressure loss. Consequently, the total flow delivered by the fluid delivery device 10 passes through this manifold 54.

In process step V8, a pressure control value is determined based on the pressure setpoint (target pressure setpoint) and the first pressure loss. In process step V8 for determining or calculating the pressure control value, the pressure value is determined that the fluid delivery device 10 should generate so that cleaning fluid with the pressure setpoint can be dispensed from the first cleaning device 41, 42, 43. The pressure control value is calculated, for example, by adding the pressure setpoint and the first pressure loss. This process step is carried out either by the control device 60 or by the fluid delivery device 10.

In process step V9, the fluid delivery device 10 is adjusted in such a way that a fluid pressure provided by the fluid delivery device 10 is changed in the direction of the pressure control value. This process step is carried out either by the control device 60 or by the fluid delivery device 10.

Process steps V1 to V3 are only carried out once for each cleaning request, whereas process steps V4 to V9 are carried out as often as necessary until the actual fluid pressure has approached a predetermined distance from the pressure control value.

LIST OF REFERENCE SYMBOLS

1 Cleaning system
10 Fluid delivery device/pump
11 Fluid inlet port (of the fluid delivery device)
12 Fluid output port (of the fluid delivery device)
20 Pressure sensor
30 Fluid distribution device/valve block
31 Inlet port (of the fluid distribution device)
32_1 (first) output port (of the fluid distribution device)
32_2 (second) output port (of the fluid distribution device)
32_3 (third) output port (of the fluid distribution device)
41 (first) cleaning device/cleaning nozzle
42 (second) cleaning device/cleaning nozzle

43 (third) cleaning device/cleaning nozzle
51 (first) fluid line
52 (second) fluid line
53 (third) fluid line
54 Collecting fluid line
60 Control unit
61 Data line/signal line
62 Data line/signal line
S1 (first) motor vehicle component/(first) sensor/motor vehicle sensor/optical sensor
S2 (second) motor vehicle component/(second) sensor/ motor vehicle sensor/optical sensor
S3 (third) motor vehicle component/(third) sensor/motor vehicle sensor/optical sensor
V1 process step
V2 process step
V3 process step
V4 process step
V5 process step
V6 process step
V7 Process step
V8 process step
V9 Process step

The invention claimed is:

1. A method of controlling a cleaning system for motor vehicle components, the cleaning system comprising:
   a fluid delivery device;
   a pressure sensor for determining a pressure generated by the fluid delivery device;
   a fluid distribution device with at least one input port fluidly connected to the fluid delivery device and with at least two output port fluidly connected to the input port (31), wherein each output port is adjustable between an open position and a closed position;
   at least two cleaning devices, each fluidly connected via a fluid line to a respective output port; and
   a control device which is data-coupled to the fluid delivery device and the fluid distribution device for transmitting and/or receiving signals,
wherein the method comprises the following process steps:
   determining a cleaning request for all cleaning devices;
   determining a pressure setpoint for at least one first cleaning device;
   adjusting the output ports of the fluid distribution device in their open position or in their closed position according to the cleaning request;
   determining of an actual fluid pressure generated by the fluid delivery device;
   determining a total flow rate delivered by the fluid delivery device based on the actual fluid pressure;
   determining a first flow rate through the first cleaning device based on the total flow rate;
   determining a first pressure loss in a line path via which the first cleaning device is fluidly connected to the fluid delivery device, taking into account the first flow rate;
   determining a pressure control value based on the pressure setpoint and the first pressure loss; and
   adjusting of the fluid delivery device in such a way that a fluid pressure provided by the fluid delivery device is changed in the direction of the pressure control value.

2. The method according to claim 1, wherein the method step of determining a total flow rate delivered by the fluid delivery device is carried out using power level information of the fluid delivery device.

3. The method according to claim 1, wherein the method step of determining a total flow rate delivered by the fluid delivery device is carried out using a characteristic diagram of the fluid delivery device which indicates the total flow rate which can be achieved by the fluid delivery device as a function of the fluid pressure for different power levels of the fluid delivery device.

4. The method according to claim 1, wherein the fluid delivery device is set to the lowest power level at which the pressure control value can be achieved by the fluid delivery device.

5. The method according to claim 1, wherein the method step of determining the first flow rate through the first cleaning device is also carried out based on switching positions of the output ports of the fluid distribution device.

6. The method according to claim 1, wherein the method step of determining the first flow rate through the first cleaning device is also carried out based on a first conversion table indicating the ratios of the flow rates through the line paths assigned to the respective cleaning devices as a function of fluid pressures provided by the fluid delivery device.

7. The method according to claim 1, wherein the method step of determining the first flow rate through the first cleaning device is also carried out based on at least one second conversion table, wherein in a second conversion table the percentage flow rates are determined by the line paths assigned to the respective cleaning devices for all permutations of switching positions of all output ports of the fluid distribution device for a fluid pressure provided by the fluid delivery device.

8. The method according to claim 1, wherein the method step of determining the first pressure loss is also carried out taking into account the total flow rate delivered by the fluid delivery device.

9. The method according to claim 1, wherein in the method step of determining at least one pressure setpoint for at least one first cleaning device, at least one further pressure setpoint for at least one second cleaning device is additionally determined and a value calculated on the basis of these determined pressure setpoints is adopted as the pressure setpoint.

10. A cleaning system for motor vehicle components, comprising:

a fluid delivery device;

a pressure sensor for determining a pressure generated by the fluid delivery device;

a fluid distribution device with at least one input port fluidly connected to the fluid delivery device and with at least two output ports fluidly connected to the input port, wherein each output port is adjustable between an open position and a closed position;

at least two cleaning devices, each fluidly connected via a fluid line to a respective output port; and a control device which is data-coupled to the fluid delivery device and the fluid distribution device for transmitting and/or receiving signals, wherein the control device is designed to carry out the method according to claim 1.

11. A motor vehicle comprising at least two motor vehicle components and with a cleaning system for cleaning the motor vehicle components according to claim 10.

\*   \*   \*   \*   \*